(No Model.)
L. DORSCH, Sr.
AGRICULTURAL IMPLEMENT.
No. 508,210. Patented Nov. 7, 1893.
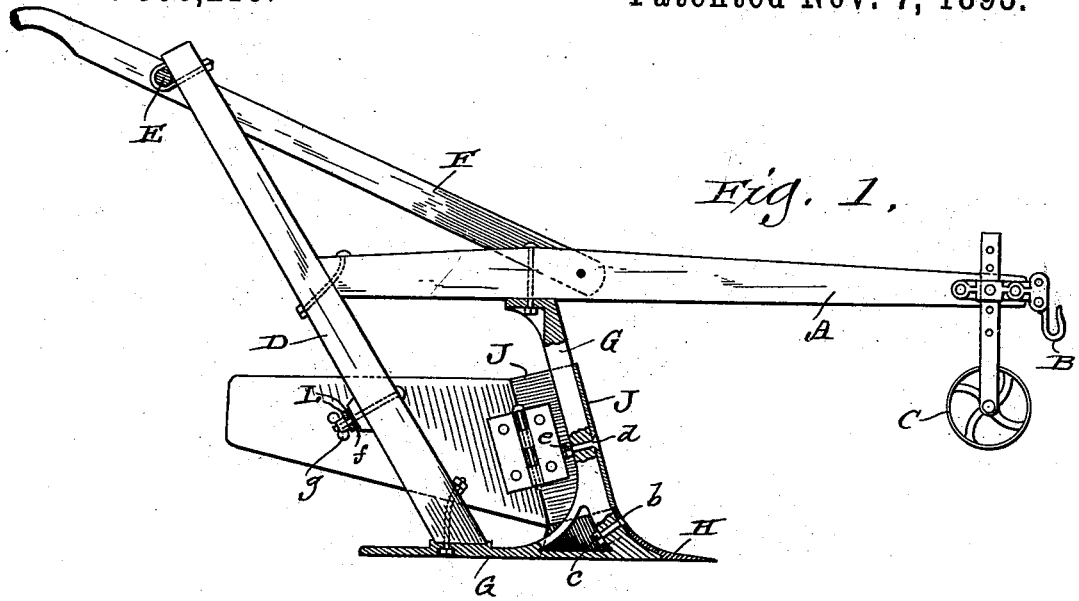
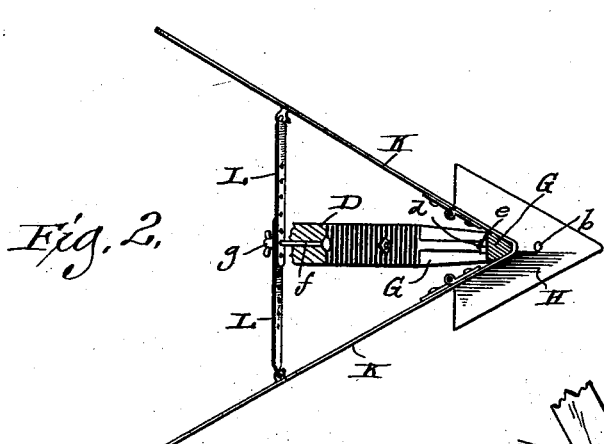
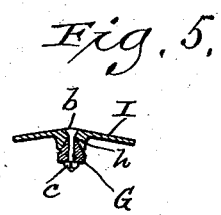
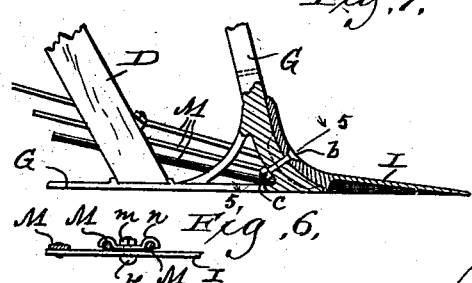
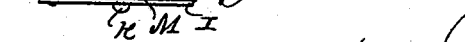
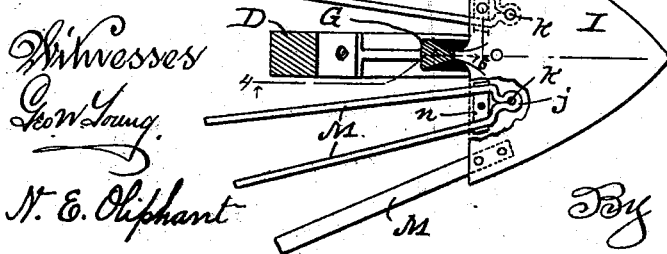
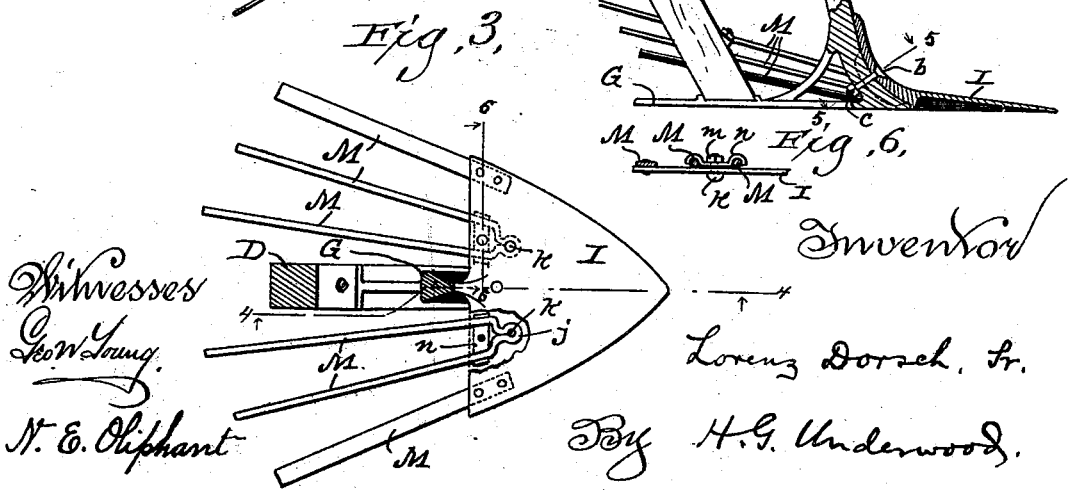
Witnesses
Geo. W. Young.
N. E. Oliphant
Inventor
Lorenz Dorsch, Sr.
By H. G. Underwood.
C. H. Korney
THE NATIONAL LITHOGRAPHING COMPANY,
WASHINGTON, D. C.

UNITED STATES PATENT OFFICE.

LORENZ DORSCH, SR., OF MILWAUKEE, WISCONSIN.

AGRICULTURAL IMPLEMENT.

SPECIFICATION forming part of Letters Patent No. 508,210, dated November 7, 1893.

Application filed October 18, 1892. Serial No. 449,230. (No model.)

*To all whom it may concern:*

Be it known that I, LORENZ DORSCH, Sr., a citizen of the United States, and a resident of Milwaukee, in the county of Milwaukee, and in the State of Wisconsin, have invented certain new and useful Improvements in Agricultural Implements; and I do hereby declare that the following is a full, clear, and exact description thereof.

My invention has for its object to provide a convertible potato hiller and digger; and it consists in certain peculiarities of construction and combination of parts hereinafter described with reference to the accompanying drawings and subsequently claimed.

In the drawings: Figure 1 represents a side elevation, partly in section, illustrating my improved implement organized as a potato hiller; Fig. 2, a plan view of the same partly in horizontal section; Fig. 3, a like view showing the implement organized as a potato digger; Fig. 4, a section taken on line 4—4 of the preceding figure; Fig. 5, a section taken on line 5—5 of Fig. 4; and Fig. 6, a section taken on line 6—6 of Fig. 3.

Referring by letter to the drawings, A represents a draft-beam provided at its forward end with an ordinary clevis B and a gage-wheel C, these latter parts being vertically adjustable as is usual in connection with plows and analogous implements. At its rear end the beam is bolted or otherwise rigidly connected to a stanchion D, and the latter is also rigidly connected to a round E that joins a pair of steering handles F, the forward end of these handles being bolted or otherwise suitably secured to said beam on opposite sides of the same. Bolted to the beam and lower end of the stanchion D is a standard G, and this standard is designed for the support of the interchangeable hilling and digging devices hereinafter specified.

As shown in Figs. 1 and 2, the hilling device consists of a triangular point H bolted to the standard G, the same bolt $b$ and nut $c$ serving to connect the shovel portion I of the digging device to said standard.

Forming part of the hilling device is a vertically disposed > shaped plate J that straddles the standard G above the point H, and by means of a bolt $d$ and nut $e$ said plate is detachably secured on said standard.

Hinged to the edges of the plate J are rearwardly extending wings K and swiveled to the inner side of each wing is a plate L having a series of perforations. The plates L overlap each other and registering perforations in said plates engage a bolt $f$ passed through the stanchion D, a thumb-nut $g$ being employed to hold said plates in their engagement with the bolt. By means of the plates L connected to the stanchion D in the manner described, I provide a stay-brace for the wings K, and this brace being adjustable in the matter of length, I can accommodate the hilling device to different widths between rows of potato plants, the plate J serving to part the earth turned up by the point H and deflect this earth in opposite directions.

The digging device has the rear side of its shovel portion I provided with a seat $h$ that straddles the standard G when said digging device is substituted for the hilling device previously specified, and extended rearward from the shovel is a series of prongs M that form a grating. As shown, the outer prongs are plain bars riveted direct to the under side of the shovel I and the inner prongs individually consist of a single rod bent to form an eye $j$ that engages a bolt $k$ passed through said shovel to receive a nut $m$ opposed to said eye. From the eye $j$ the rod extends rearward in opposite directions, and clips $n$ bolted to the under side of the shovel serve to maintain the inner prongs against play on the bolts $k$, this construction being clearly illustrated in Figs. 3 and 6.

When the digging device is employed on the standard, the shovel portion of the former raises the potatoes and earth, the latter being screened from said potatoes by the grating above specified.

The implement above described may be readily utilized for trenching, ditching or subsoiling, and as only the detachable parts are liable to wear they may be readily replaced from time to time with but little expense.

Having thus described my invention, what I claim as new, and desire to secure by Letters Patent, is—

1. A draft-beam and steering handles, a stanchion joined to the same, a standard connecting the draft-beam and stanchion, a clamping device engaging the standard, a hilling point for detachable engagement with the clamping device and standard, a triangular plate that straddles said standard above the point when in position for use, another clamping device for detachably connecting the plate and standard, and wings diverging rearward from said plate, substantially as set forth.

2. A draft-beam and steering handles, a stanchion joining the same, a standard connecting the draft-beam and stanchion, a clamping device engaging the standard, a hilling point for detachable engagement with the clamping device and standard, a triangular plate that straddles said standard above the point when in position for use, another clamping device for detachably connecting the plate and standard, hinged wings diverging rearward from the plate, a brace joined to each wing and suitable means for adjustably connecting these braces with each other and said stanchion, substantially as set forth.

3. A draft beam and steering handles, a stanchion joined to the same, a standard connecting the draft-beam and stanchion, a clamping device engaging the standard for the attachment thereto of a hiller or digger and another clamping device engaging said standard for the connection therewith of a straddling triangular plate employed in connection with the hiller and having rearwardly diverging wings, substantially as set forth.

In testimony that I claim the foregoing I have hereunto set my hand, at Milwaukee, in the county of Milwaukee and State of Wisconsin, in the presence of two witnesses.

LORENZ DORSCH, Sr.

Witnesses:
 N. E. OLIPHANT,
 GEO. W. YOUNG.